United States Patent
Nampei et al.

(10) Patent No.: US 10,471,985 B2
(45) Date of Patent: Nov. 12, 2019

(54) MOTOR CONTROL UNIT AND ELECTRIC POWER STEERING APPARATUS AND VEHICLE EQUIPPED WITH THE SAME

(71) Applicant: NSK LTD., Tokyo (JP)

(72) Inventors: Kouichi Nampei, Fujisawa (JP); Yoshihiro Aosaki, Fujisawa (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 4 days.

(21) Appl. No.: 15/531,535

(22) PCT Filed: Mar. 9, 2016

(86) PCT No.: PCT/JP2016/057345
§ 371 (c)(1),
(2) Date: May 30, 2017

(87) PCT Pub. No.: WO2016/152523
PCT Pub. Date: Sep. 29, 2016

(65) Prior Publication Data
US 2018/0290682 A1    Oct. 11, 2018

(30) Foreign Application Priority Data

Mar. 23, 2015 (JP) ................. 2015-060027
Mar. 23, 2015 (JP) ................. 2015-060028

(51) Int. Cl.
*B62D 5/04* (2006.01)
*H02P 29/028* (2016.01)

(52) U.S. Cl.
CPC ......... *B62D 5/0484* (2013.01); *B62D 5/0463* (2013.01); *B62D 5/0487* (2013.01); *H02P 29/028* (2013.01)

(58) Field of Classification Search
None
See application file for complete search history.

(56) References Cited

U.S. PATENT DOCUMENTS

2006/0012323 A1* 1/2006 Endo .................... B62D 5/0463
                                                                 318/432
2011/0156629 A1* 6/2011 Satou ................... B62D 5/0484
                                                                 318/453
(Continued)

FOREIGN PATENT DOCUMENTS

JP          8-133108 A    5/1996
JP     2013-141869 A    7/2013
(Continued)

OTHER PUBLICATIONS

International Search Report for PCT/JP2016/057345 dated Jun. 7, 2016.

*Primary Examiner* — Thomas G Black
*Assistant Examiner* — Demetra R Smith-Stewart
(74) *Attorney, Agent, or Firm* — Sughrue Mion, PLLC

(57) ABSTRACT

[Problem]
An object of the present invention is to provide a motor control unit that improves a discontinuous feeling of an assist by flexibly making an adjustment of a current command value of a normal system when a failure occurs in any system of multi-system motor control, and enables smooth handling, and to provide an electric power steering apparatus and a vehicle equipped with the same.
[Means for Solving the Problem]
A motor control unit comprises motor driving circuits of respective winding systems that supply a motor having multi-system motor windings with driving currents; and a control calculating section that calculates a current command value of each winding system for driving the motor, when a failure occurs in the motor winding or the motor driving circuit in any of the systems, performs a first change of changing a characteristic of the current command value of a normal system to a first characteristic that forms a characteristic equivalent to a total of the current command values (Continued)

at normal time, after performing the first change, performs a second change of changing the characteristic of the current command value to a second characteristic whose output is more suppressed than the first characteristic, and controls the motor driving circuit.

19 Claims, 14 Drawing Sheets

(56) References Cited

U.S. PATENT DOCUMENTS

| | | | | |
|---|---|---|---|---|
| 2011/0214934 | A1* | 9/2011 | Ueda | B62D 5/046 |
| | | | | 180/446 |
| 2013/0179039 | A1* | 7/2013 | Uryu | 701/42 |
| 2013/0299271 | A1* | 11/2013 | Endo | B62D 5/046 |
| | | | | 180/446 |
| 2014/0054103 | A1* | 2/2014 | Kezobo | B62D 5/0487 |
| | | | | 180/446 |
| 2015/0314804 | A1 | 11/2015 | Aoki et al. | |
| 2016/0134242 | A1* | 5/2016 | Watanabe | H03F 3/19 |
| | | | | 330/296 |

FOREIGN PATENT DOCUMENTS

| | | |
|---|---|---|
| JP | 2013-159165 A | 8/2013 |
| JP | 5387989 B2 | 1/2014 |
| WO | 2013/105225 A1 | 7/2013 |
| WO | 2014/115275 A1 | 7/2014 |
| WO | 2014/203300 A1 | 12/2014 |
| WO | 2015/022718 A1 | 2/2015 |

\* cited by examiner

MOTOR CONTROL UNIT AND ELECTRIC POWER STEERING APPARATUS AND VEHICLE EQUIPPED WITH THE SAME

CROSS REFERENCE TO RELATED APPLICATIONS

This application is a National Stage of International Application No. PCT/JP2016/057345 filed Mar. 9, 2016, claiming priority based on Japanese Patent Application No. 2015-060027 filed Mar. 23, 2015 and 2015-060028 filed Mar. 23, 2015, the contents of all of which are incorporated herein by reference in their entirety.

TECHNICAL FIELD

The present invention relates to a motor control unit that drives and controls a motor having multi-system motor windings and to an electric power steering apparatus and a vehicle equipped with the same, and in particular to the motor control unit that improves a discontinuous feeling of an assist and enables smooth handling by adjusting a current command value of a normal system when a failure occurs in any of the systems, and to the electric power steering apparatus and the vehicle equipped with the same.

BACKGROUND ART

An electric power steering apparatus (EPS) serves as an apparatus where a driving section is equipped with a motor. The electric power steering apparatus provides a steering mechanism of a vehicle with a steering assist force (assist force) by means of a rotational force of the motor, and applies a motor driving force controlled with an electric power supplied from an inverter as the steering assist force to a steering shaft or a rack shaft by means of a transmission mechanism such as gears. In order to accurately generate the assist torque of the steering assist force, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control. A brushless motor that is superior in durability and serviceability and has little noise, is commonly used as the motor.

A general configuration of the conventional electric power steering apparatus will be described with reference to FIG. 1. As shown in FIG. 1, a column shaft (a steering shaft, a handle shaft) 2 connected to a steering wheel 1 is connected to steered wheels 8L and 8R through reduction gears 3 in a reducing section, universal joints 4a and 4b, a rack and pinion mechanism 5, tie rods 6a and 6b, further via hub units 7a and 7b. In addition, the column shaft 2 is provided with a torque sensor 10 for detecting a steering torque Ts of the steering wheel 1 and a steering angle sensor 14 for detecting a steering angel θ, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command based on the steering torque Ts detected by the torque sensor 10 and a vehicle speed Vs detected by a vehicle speed sensor 12, and controls a current supplied to the motor 20 for EPS based on a voltage control command value Vref obtained by performing compensation and so on with respect to the current command value.

Further, the steering angle sensor 14 is not indispensable and may not be provided, and it is possible to obtain the steering angle from a rotational position sensor such as a resolver connected to the motor 20.

A controller area network (CAN) 40 to send/receive various information and signals on the vehicle is connected to the control unit 30, and it is also possible to receive the vehicle speed Vs from the CAN 40. Further, it is also possible to connect a non-CAN 41 to the control unit 30 sending/receiving a communication, analog/digital signals, a radio wave or the like except the CAN 40 to the control unit 30.

The control unit 30 mainly comprises a CPU (including an MCU, an MPU and so on), and general functions performed by programs within the CPU are shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31 calculating a current command value Iref1. The current command value calculating section 31 calculates the current command value Iref1 that is a control target value of a current supplied to the motor 20 based on the steering torque Ts and the vehicle speed Vs and by means of an assist map or the like. The current command value Iref1 is inputted into a current limiting section 33 through an adding section 32A. A current command value Irefm the maximum current of which is limited is inputted into a subtracting section 32B, and a deviation I (Irefm−Im) between the current command value Irefm and a motor current value Im being fed back is calculated. The deviation I is inputted into a PI-control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37 serving as a driving section. The motor current value Im of the motor 20 is detected by a motor current detector 38 and is fed back to the subtracting section 32B. The inverter 37 uses field effect transistors (FETs) as driving elements and is comprised of a bridge circuit of FETs.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34-3 and an inertia 34-2 in an adding section 34-4, further adds the result of addition performed in the adding section 34-4 with a convergence 34-1 in an adding section 34-5, and then outputs the result of addition performed in the adding section 34-5 as the compensation signal CM.

In such an electric power steering apparatus, cases that use a motor having multi-system motor windings of a constitution to continue a motor operation even if a failure (including an abnormality) of the motor occurs, are increasing. For examples, with respect to a motor having two-system motor windings, coils of a stator are separated into two systems (a U1 phase to a W1 phase and a U2 phase to a W2 phase), and it is possible to rotate a rotor of the other system even if the failure occurs in one system and to continue an assist control.

With respect to a motor control unit and an electric power steering apparatus equipped with such a motor, a method to adjust the current command value when the failure occurs in the motor winding or the inverter has been proposed. For an example, in Japanese Unexamined Patent Publication No. 2013-159165 A (Patent Document 1), an electric power steering apparatus that is provided with two systems of a motor coil and applies the assist force by driving and controlling each one, adjusts the current command value so as to make a calorific value equivalent to or less than normal one to the other system when the failure occurs in one of the systems, suppresses heat generation, and continues the assist without lowering steering feeling. Further, in a publication of Japanese Patent No. 5387989 B (Patent Document 2), when a multi-system electric motor drive unit (motor control unit) judges that the inverter or the winding group has failed in any of the systems, it stops supplying an electric power to the inverter of the faulty system, adjusts the current command value to the normal system (instead, an input value (a feedback current) to an electric power control means may be used), and makes the inverter of the normal system compensate the electric power that has been supplied by the inverter of the faulty system. After the lapse of a fixed time from the judgement of the failure, the multi-system electric motor drive unit adjusts the current command value, gradually reduces the electric power compensated by the inverter of the normal system, and prevents abnormal heat generation.

THE LIST OF PRIOR ART DOCUMENTS

Patent Documents

Patent Document 1: Japanese Unexamined Patent Publication No. 2013-159165 A
Patent Document 2: Japanese Patent No. 5387989 B

SUMMARY OF THE INVENTION

Problems to be Solved by the Invention

However, in the apparatus disclosed in Patent Document 1, the maximum value of the current command value set to the other system when the failure occurs in one of the systems is a value that makes the calorific value of the other system equivalent to the normal calorific value, a larger value than that is not set, so that there is a possibility that a gap is generated between the current command values set before and after the failure, and the gap may influence the steering feeling. Further, a detail method to determine the value that makes the calorific value of the other system equivalent to the normal calorific value is also unclear. The unit disclosed in Patent Document 2 outputs the current command value multiplied by N/(N−M) to the inverter of the normal system after the judgement of the failure in the case that the number of the systems is N and the number of the faulty systems is M, so that it is estimated that there is little gap between the current command values set before and after the failure. However, the unit makes the adjustment of the current command value by means of the multiplying factor, also makes an adjustment of the current command value in gradual reduction processing for gradually reducing the electric power compensated by the inverter of the normal system by means of the multiplying factor or subtraction of a fixed value, so that the adjustment of the current command value cannot be made flexibly. For example, it is not possible to take such measures as make a difference between gradual reduction factors of the current command value when a steering torque is small and large.

The present invention has been developed in view of the above-described circumstances, and an object of the present invention is to provide a motor control unit that improves a discontinuous feeling of an assist by flexibly making an adjustment of a current command value of a normal system when a failure occurs in any system of multi-system motor control, and enables smooth handling, and to provide an electric power steering apparatus and a vehicle equipped with the same.

Means for Solving the Problems

The present invention relates to a motor control unit that drives and controls a motor having multi-system motor windings, the above-described object of the present invention is achieved by that comprising: motor driving circuits of respective winding systems that supply the motor having the multi-system motor windings with driving currents; and a control calculating section that calculates a current command value of each winding system for driving the motor, when a failure occurs in the motor winding or the motor driving circuit in any of the systems, performs a first change of changing a characteristic of the current command value of a normal system to a first characteristic that forms a characteristic equivalent to a total of the current command values at normal time, after performing the first change, performs a second change of changing the characteristic of the current command value to a second characteristic whose output is more suppressed than the first characteristic, and controls the motor driving circuit.

The above-described object of the present invention is more effectively achieved by that wherein the second characteristic is a characteristic whose gradient is gentler than the first characteristic and that asymptotically changes so as to converge at a maximum output near the maximum output; or wherein the second characteristic is a characteristic whose output does not exceed a maximum output and that is equivalent to the first characteristic until the maximum output; or wherein the characteristic of the current command value is defined by an assist map; or wherein a change from the first characteristic to the second characteristic is gradually performed according to a lapse of time; or wherein the change from the first characteristic to the second characteristic is performed by switching to a prepared assist map at a predetermined time interval; or wherein a change from the first characteristic to the second characteristic is performed in accordance with a steering condition or a driving condition; or wherein the change from the first characteristic to the second characteristic is performed when there is no steering torque, when a steering wheel is near a center, when a vehicle runs straight, or when a vehicle stops; or wherein the characteristic of the current command value is a characteristic that changes depending on at least a steering torque; or wherein a system where the failure occurs in the motor winding or the motor driving circuit is cut off when the failure occurs.

By applying the above motor control unit to an electric power steering apparatus, the high reliability electric power steering apparatus that improves a discontinuous feeling of an assist when a failure occurs, and enables smooth handling, is achieved. By equipping a vehicle with the electric power steering apparatus, it is possible to further improve a reliability of the vehicle.

Effects of the Invention

The motor control unit according to the present invention enables improvement of a discontinuous feeling of an assist and a reduction in a fluctuation of the steering torque that occurs on change of the assist map by changing the characteristic of the current command value so as to be equivalent to one before the failure and subsequently shifting or switching a present map to a dedicated map at failure when the failure occurs in any system of multi-system motor control.

Moreover, the electric power steering apparatus equipped with the motor control unit according to the present invention enables smooth handling, and equipping the vehicle with this electric power steering apparatus enables improvement of a steering feeling.

MODE FOR CARRYING OUT THE INVENTION

Figure 4:
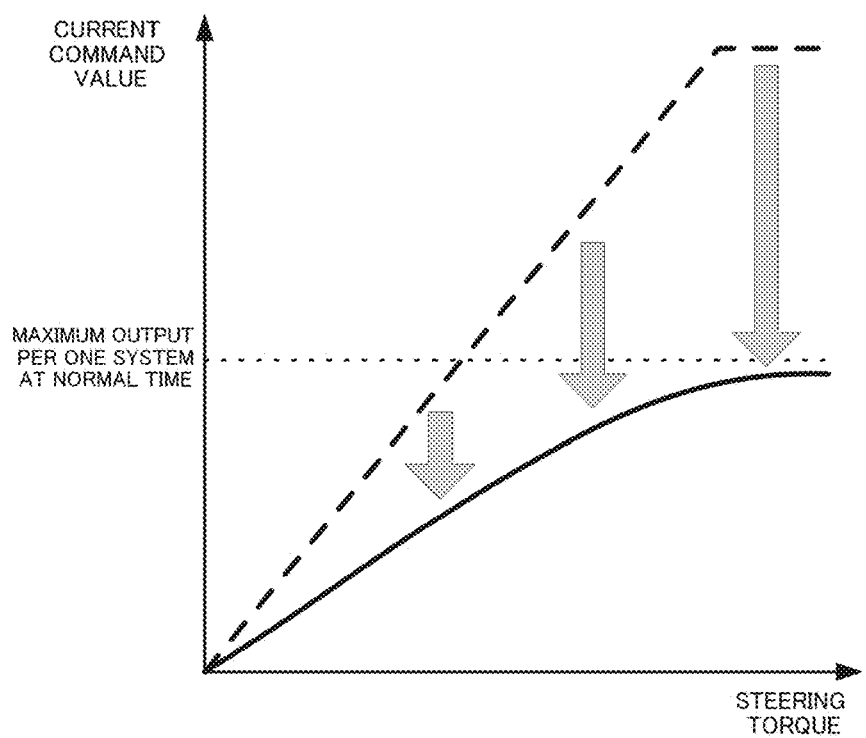
FIG. 4 is a characteristic diagram showing an example of an assist map at failure.
Figure 5:
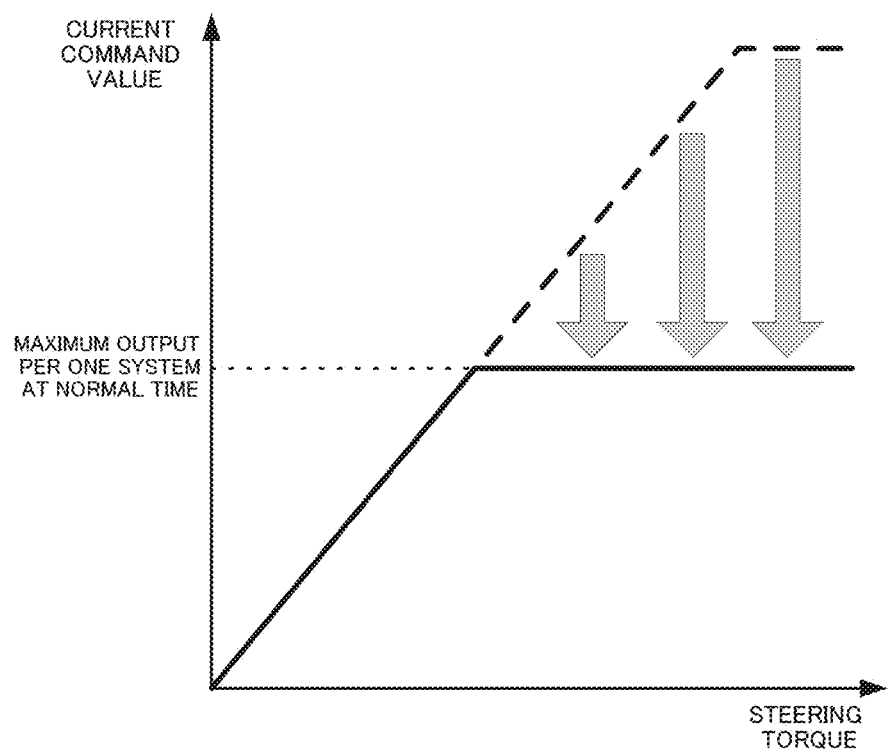
FIG. 5 is a characteristic diagram showing another example of the assist map at failure.

The present invention changes a characteristic of a current command value being a control target value of a current supplied to a motor so as to be equivalent to one before a failure when the failure (including an abnormality) occurs in a motor winding of a motor having multi-system motor windings or a motor driving circuit comprising an inverter and so on, and subsequently changes it to a characteristic whose output is suppressed. For example, in the case that the motor windings consist of two systems and that an assist map of the current command value used in each system, hereinafter called a "by-system assist map", has a characteristic of changing in accordance with a steering torque as shown by a solid line in FIG. 3, an assist map of the whole current command value, hereinafter called a "whole assist map", has a characteristic as shown by a broken line in FIG. 3, hereinafter called a "whole characteristic", because two systems drive and control the motor by equivalent outputs at normal time. In this situation, the present invention changes the by-system assist map so as to have a characteristic (a first characteristic) that the by-system assist map of the normal system forms the whole characteristic when a failure occurs in any of the systems. A simple way is using the whole assist map as the by-system assist map of the normal system. This reduces an influence of a gap between the current command values set before and after the failure, and enables improvement of a discontinuous feeling of an assist. However, the maximum value of the first characteristic exceeds a maximum output per one system at normal time, hereinafter simply called a "maximum output", and there is a possibility that a load to the motor winding becomes large keeping the first characteristic. Thus, after changing the by-system assist map to the first characteristic, the present invention changes it to another characteristic (a second characteristic) so that the maximum value of the first characteristic does not exceed the maximum output. For example, the present invention changes the by-system assist map to a characteristic whose maximum value is equal to or smaller than the maximum output, whose gradient is gentler than the first characteristic, and which asymptotically changes so as to converge at the maximum output near the maximum output, as shown by a solid line in FIG. 4. Alternatively, as shown by a solid line in FIG. 5, the present invention changes the by-system assist map to a characteristic that is saturated with the maximum output and changes equivalently to the first characteristic until the saturation in order to obtain an assist force equivalent to the normal one until the maximum output. However, the change is gradually performed according to the lapse of time because the assist force suddenly becomes weak in some cases and there is possibility that a steering feeling is lowered when the change to the second characteristic is rapidly performed. This reduces a fluctuation of the steering torque that occurs on change of the assist map, so that a steering operator hardly loses steering control.

It is possible that the change to the second characteristic is not performed by gradually changing the by-system assist map according to the lapse of time, but is performed on a steering condition or a driving condition that the current command value becomes minimum. For example, it is possible to suppress an influence of a fluctuation of the motor assist force that the steering operator perceives before and after change of the assist map by changing to the second characteristic when the steering wheel is not provided with the steering torque.

Moreover, it is possible to calculate the current command value based on not only the steering torque but also a vehicle speed, a motor rotational frequency or the like. It is possible, for example, to prepare the assist map shown in FIG. 3 depending on such a vehicle speed as a low seed, a middle speed, and a high speed. Further, the assist map may be prepared as a lookup table, and may be also defined as a function using the steering torque or the like as a parameter. The current command value can be calculated at a high speed when the assist map is prepared as a lookup table, and an area for storing the assist map can be reduced when the assist map is defined as a function.

Hereinafter, an embodiment of the present invention will be described with reference to the accompanying drawings.

First, an example of a two-system winding motor to which the present invention is applicable will be described with reference to FIG. 6 and FIG. 7. Although the present invention relates to an electric motor, the following explanations merely describe it as a "motor".

Figure 6:
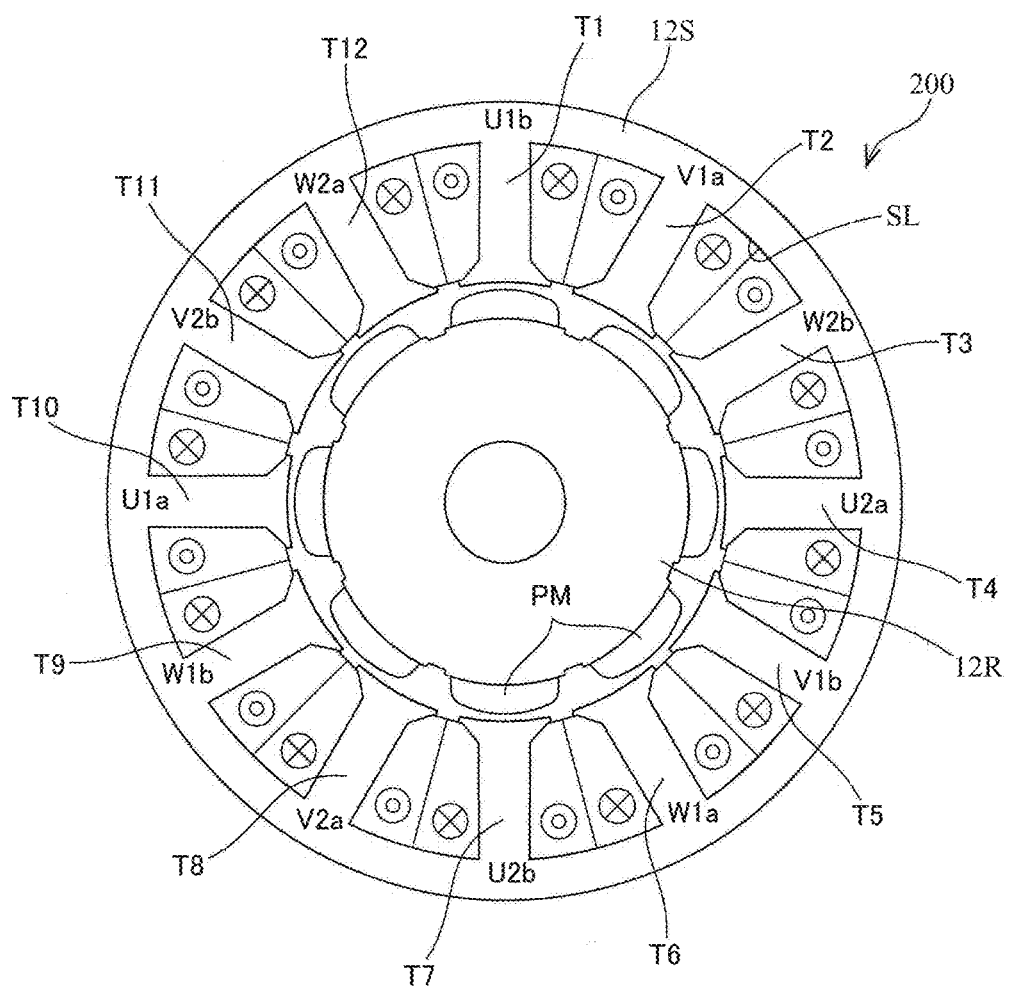
FIG. 6 is a sectional view showing a configuration example of a motor being capable of the present invention.

As shown in FIG. 6, a three-phase motor 200 has a configuration of a surface permanent magnet (SPM) motor that includes a stator 12S having teeth T which are magnetic poles and form slots SL inwardly protruding at an inner periphery, and an eight-pole surface magnet-type rotor 12R which is rotatably disposed opposite to the teeth T at the inner periphery of the stator 12S and wherein permanent magnets PM are mounted on the surface. Here, the number of the teeth T of the stator 12S is set to "phase number×2n" ("n" is an integer which is two or more). For example, in the case of n=2, the motor has a configuration of eight poles and twelve slots.

Figure 7:
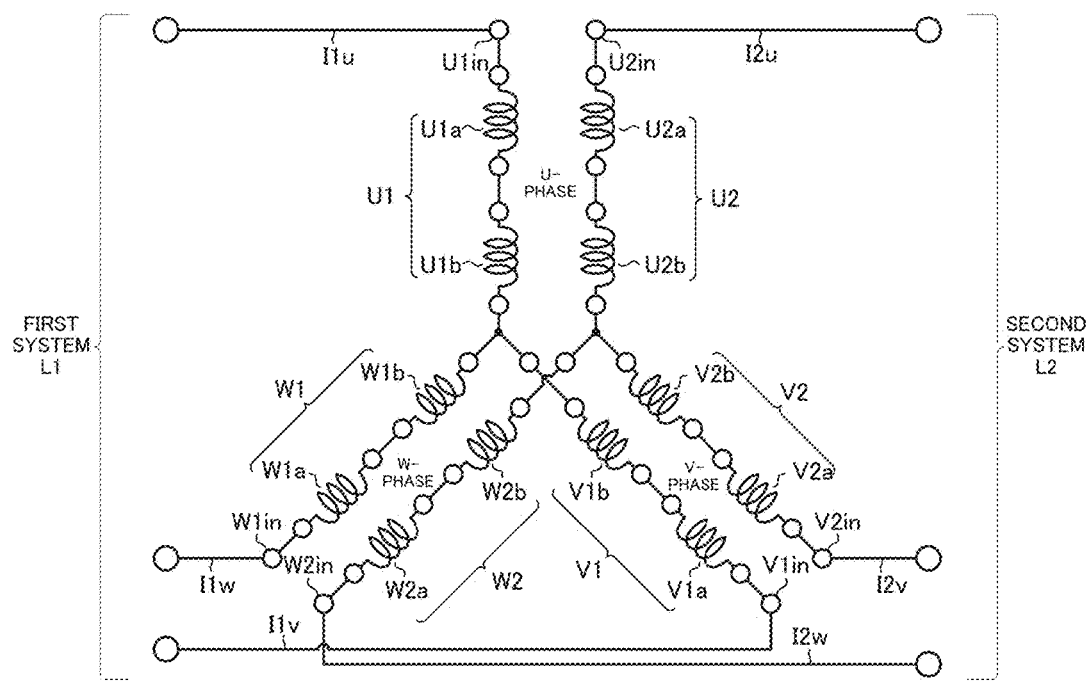
FIG. 7 is a configuration diagram showing a winding structure example of the motor being capable of the present invention.

In the two systems as shown in FIG. 7, a first three-phase motor winding L1 and a second three-phase motor winding L2, which are poly-phase motor windings that each of the same phase magnetic poles is in phase with the rotor magnets, are wound on the slots SL of the stator 12S. In the first three-phase motor winding L1, respective one-ends of a U-phase coil U1, a V-phase coil V1 and a W-phase coil W1 are connected each other so as to form a star-connection. The other ends of the phase coils U1, V1 and W1 are connected to a motor control unit 100, and motor driving currents I1u, I1v and I1w are individually supplied to the respective coils.

In the phase coils U1, V1 and W1, two coil sections U1a and U1b, V1a and V1b, and W1a and W1b are respectively formed. The coil sections U1a, V1a and W1a are wound on the teeth T10, T2 and T6 whose positions form an equilateral triangle by concentrated winding. Further, the coil sections U1b, V1b and W1b are wound on the teeth T1, T5 and T9 which are disposed at the positions where the teeth T10, T2 and T6 are respectively shifted by 90 degrees clockwise by concentrated winding.

Similarly, in the second three-phase motor winding L2, respective one-ends of a U-phase coil U2, a V-phase coil V2 and a W-phase coil W2 are connected each other so as to form the star-connection. The other ends of the phase coils U2, V2 and W2 are connected to the motor control unit 100, and motor driving currents I2u, I2v and I2w are individually supplied to the respective coils.

In the phase coils U2, V2 and W2, two coil sections U2a and U2b, V2a and V2b, and W2a and W2b are respectively formed. The coil sections U2a, V2a and W2a are wound on the teeth T4, T8 and T12 whose positions form the equilateral triangle by concentrated winding. Further, the coil sections U2b, V2b and W2b are wound on the teeth T7, T11 and T3 which are disposed at the positions where the teeth T4, T8 and T12 are respectively shifted by 90 degrees clockwise by concentrated winding.

Then, the coil sections U1a and U1b, V1a and V1b, and W1a and W1b of the phase coils U1, V1 and W1, and the coil sections U2a and U2b, V2a and V2b, and W2a and W2b of the phase coils U2, V2 and W2 are wound on the slots SL which sandwich the respective teeth T so that the current directions are the same direction.

As stated above, the coil sections U1a and U1b, V1a and V1b, and W1a and W1b of the phase coils U1, V1 and W1 which form the first three-phase motor winding L1, and the coil sections U2a and U2b, V2a and V2b, and W2a and W2b of the phase coils U2, V2 and W2 which form the second three-phase motor winding L2 are wound on the twelve teeth T which are different each other.

Figure 8:
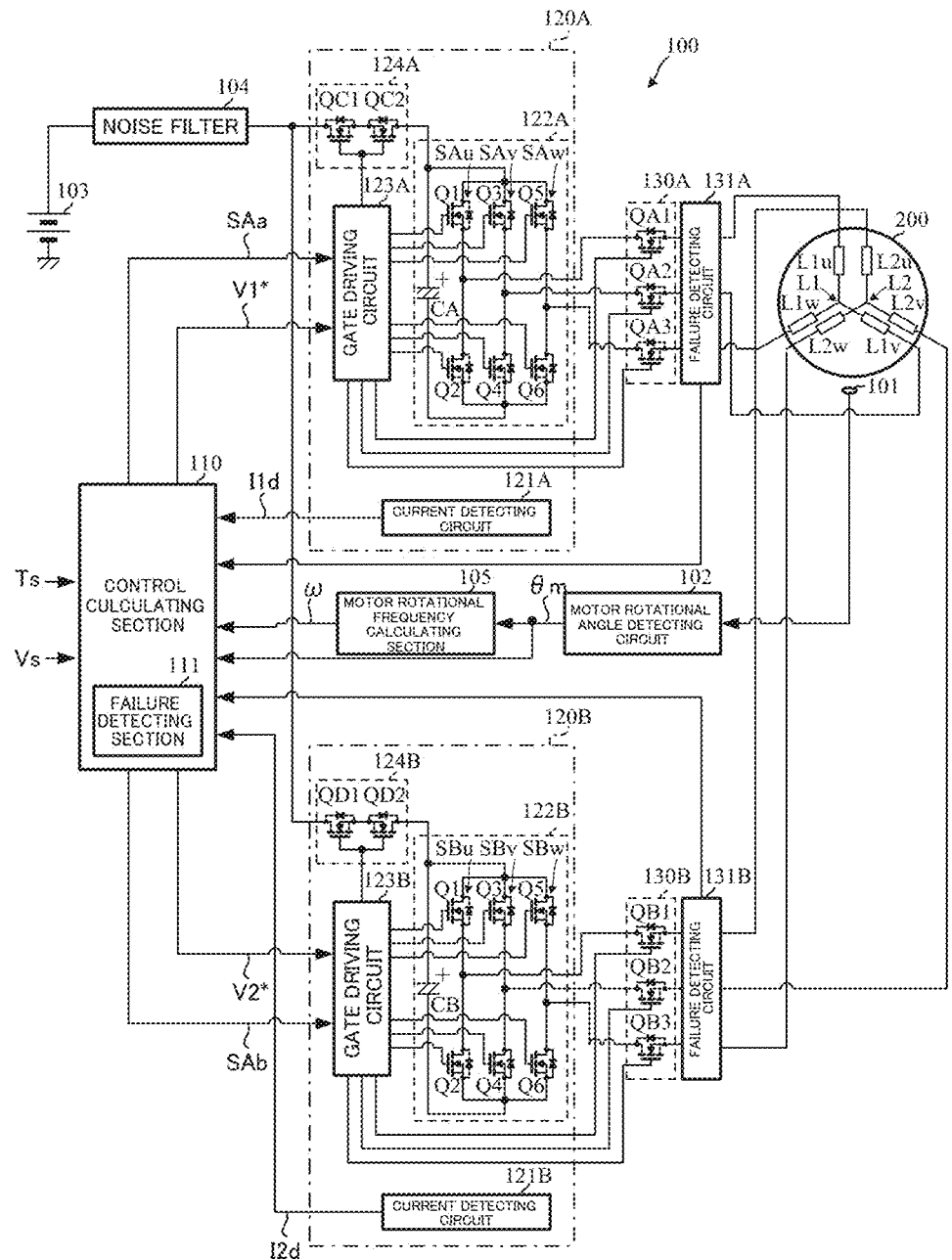
FIG. 8 is a block diagram showing a configuration example (a first embodiment) of a motor control unit of the present invention.

For such a three-phase motor having the two-system windings, an example (a first embodiment) of the motor control unit of the present invention that supplies a current from an individual inverter, decides a switching means where a failure occurs when an OFF-failure (an open failure) or an ON-failure (a short failure) that a switching means of one inverter becomes shut-down occurs, controls a switching means except the faulty switching means, and controls a normal inverter except the faulty inverter including the faulty switching means will be described with reference to FIG. 8.

The motor control unit 100 includes a failure detecting section 111, and comprises a control calculating section 110 that calculates the current command value, motor driving circuits 120A and 120B to which voltage command values (voltage control command values) V1* and V2* are individually inputted from the control calculating section 110, and motor current cut-off circuits 130A and 130B respectively provided between the output sides of the motor driving circuits 120A and 120B and the first motor winding L1 and the second motor winding L2 of the three-phase motor 200.

The three-phase motor 200 comprises a rotational position sensor 101 such as a Hall element or the like that detects a rotational position of the rotor, a value detected by the rotational position sensor 101 is inputted into a motor rotational angle detecting circuit 102, a motor rotational angle θm is detected in the motor rotational angle detecting circuit 102, the motor rotational angle θm is inputted into a motor rotational frequency calculating section 105, and a motor rotational frequency ω is calculated in the motor rotational frequency calculating section 105. A steering torque Ts detected by a torque sensor 10 and a vehicle speed Vs detected by a vehicle speed sensor 12 as well as the motor rotational angle θm outputted from the motor rotational angle detecting circuit 102 and the motor rotational frequency ω outputted from the motor rotational frequency calculating section 105 are inputted into the control calculating section 110. Moreover, motor currents I1d and I2d outputted from each coil of the first motor winding L1 and the second winding L2 of the motor 200 and outputted from current detecting circuits 121A and 121B in the motor driving circuits 120A and 120B, are inputted into the control calculating section 110. Further, a direct current is supplied to the motor driving circuits 120A and 120B through a noise filter 104 from a battery 103 as a direct-current power source.

The control calculating section 110 calculates a current command value I* with reference to an assist map based on the steering torque Ts, the vehicle speed Vs, and the motor rotational frequency ω.

Figure 9:
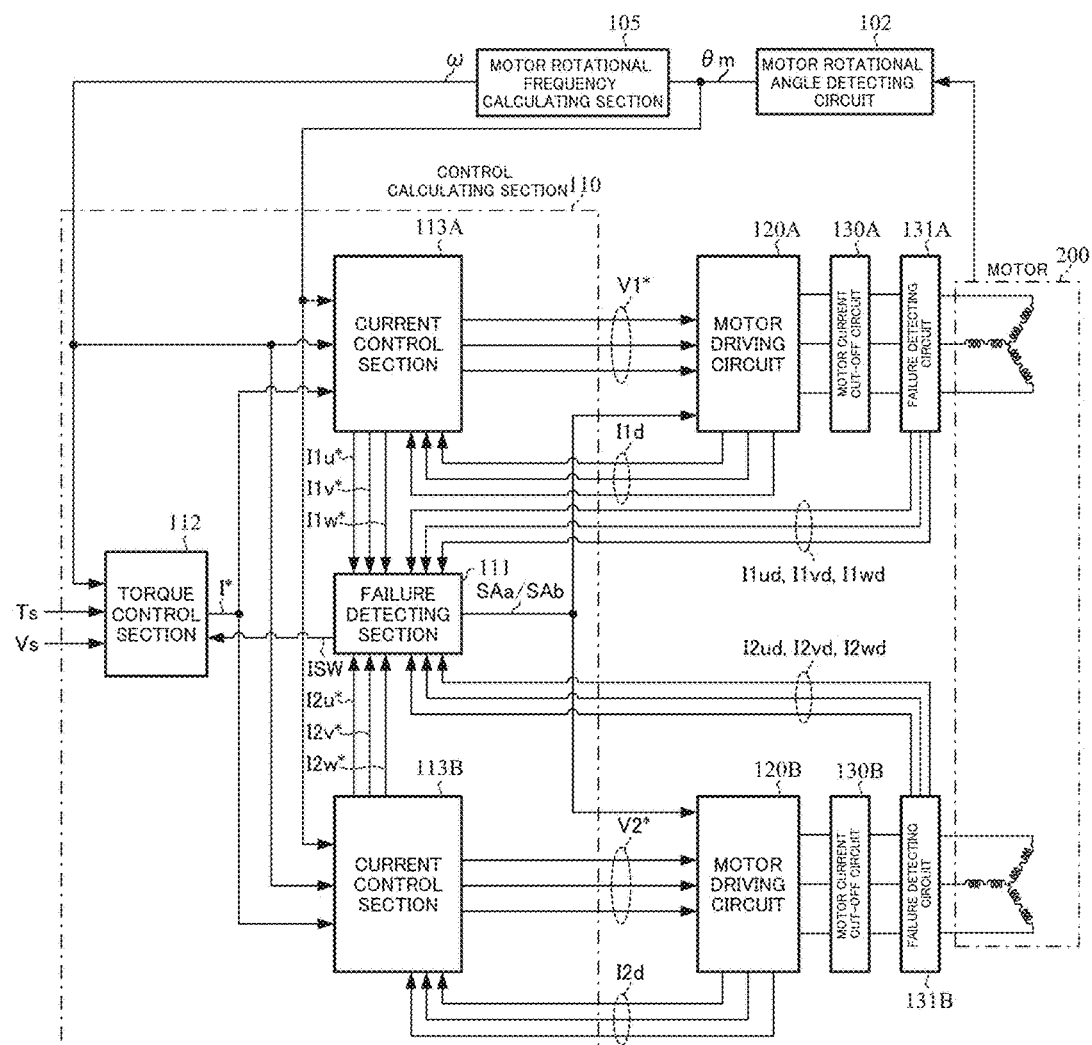
FIG. 9 is a block diagram showing a configuration example of a control calculating section of the first embodiment.

FIG. 9 shows a configuration example of the control calculating section 110. The control calculating section 110 comprises a torque control section 112, current control sections 113A and 113B, and the failure detecting section 111. The torque control section 112 calculates the current command value I* with reference to the assist map based on the steering torque Ts, the vehicle speed Vs, and the motor rotational frequency ω, and outputs it to the current control sections 113A and 113B.

Figure 1:
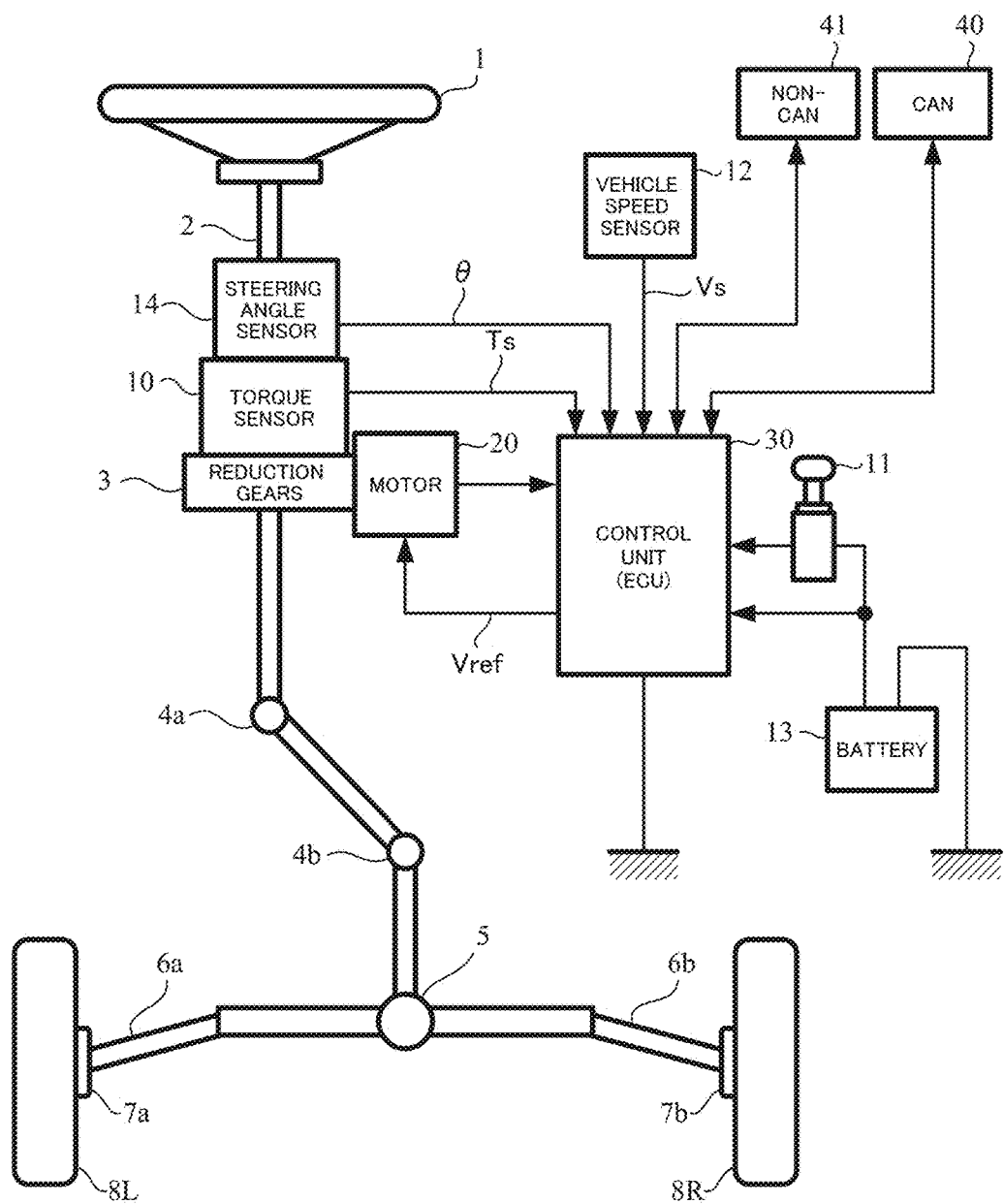
FIG. 1 is a configuration diagram illustrating a general outline of an electric power steering apparatus.
Figure 2:
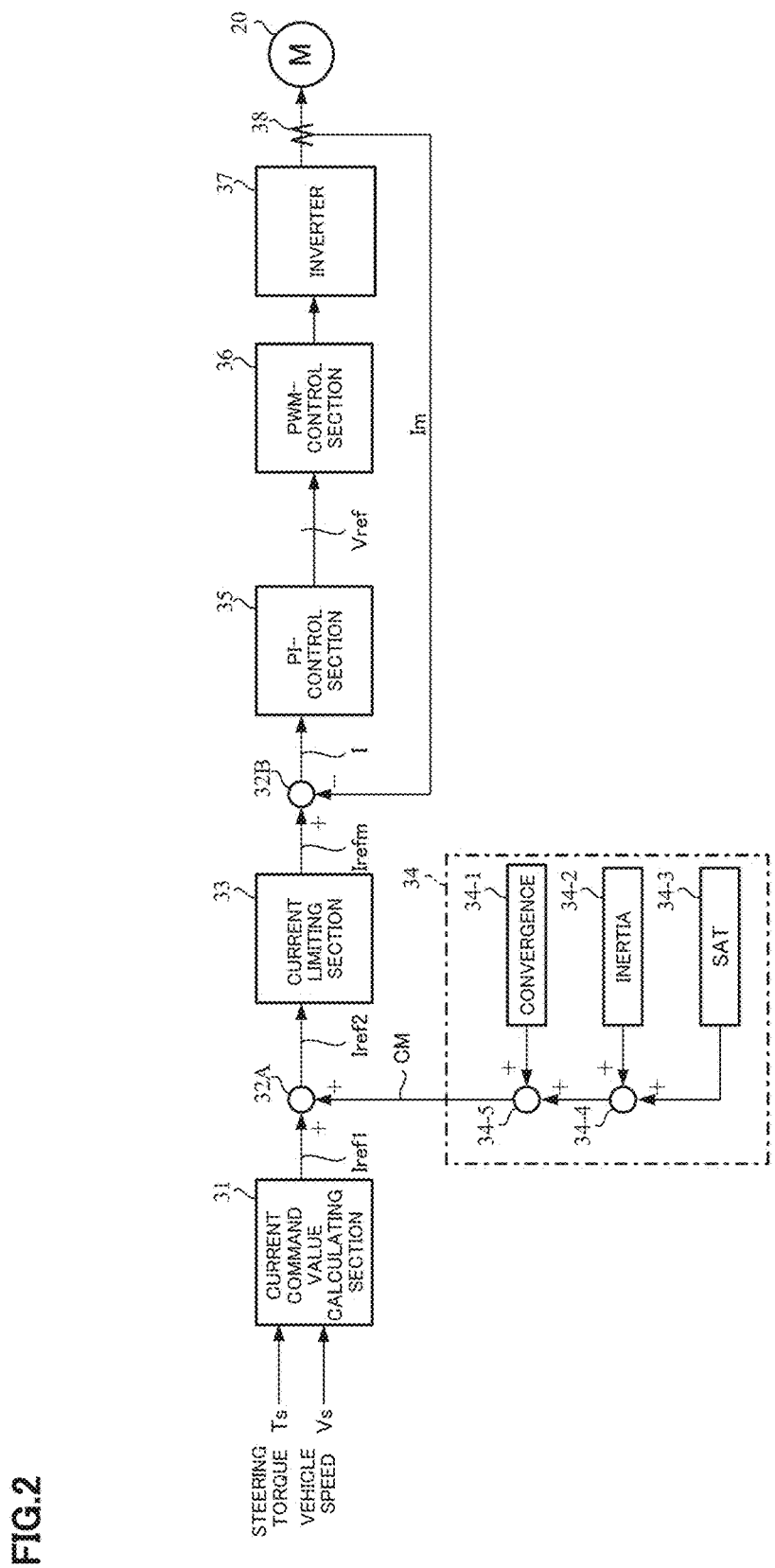
FIG. 2 is a block diagram showing a configuration example of a control unit (ECU) of the electric power steering apparatus.
Figure 3:
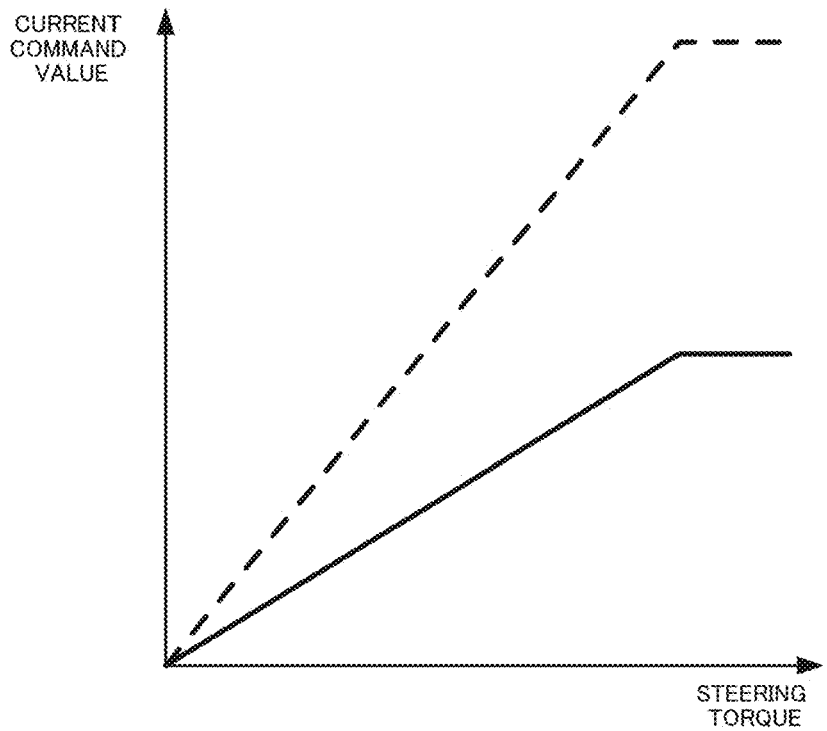
FIG. 3 is a characteristic diagram showing an example of a normal assist map.
Figure 10:
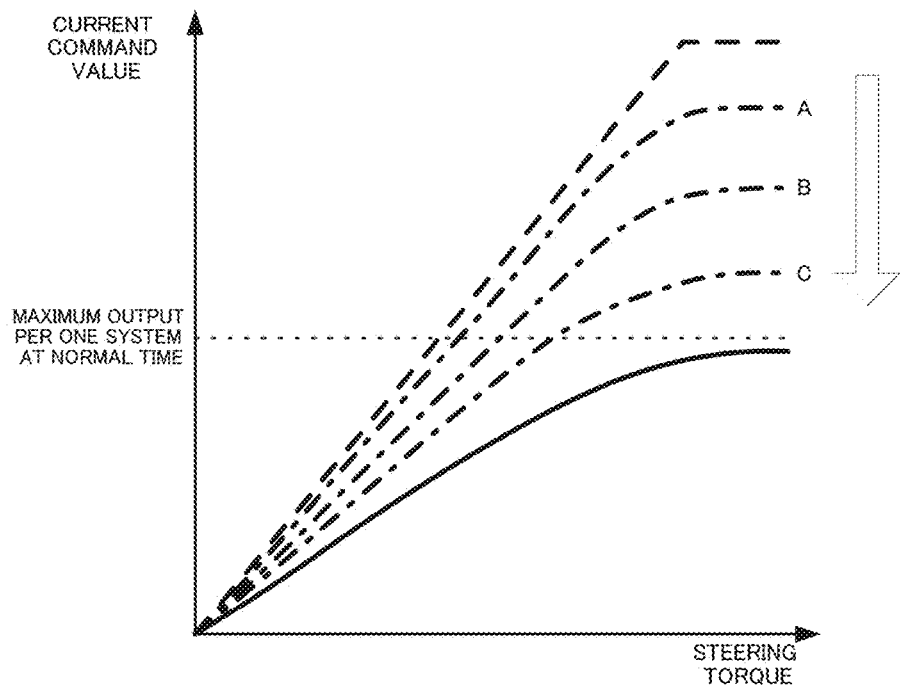
FIG. 10 is a characteristic diagram showing an example (the first embodiment) of the assist map that gradually changes in accordance with time when a failure occurs.

The torque control section 112 calculates the current command value I* by using the assist map, hereinafter called a "normal assist map", having a characteristic shown by the solid line in FIG. 3 at normal time, and by using a plural of assist maps having characteristics shown in FIG. 10 after the failure occurs, as the by-system assist map. That is, the torque control section 112 uses the assist map, hereinafter called a "first characteristic assist map", having a characteristic (a first characteristic) equivalent to the whole assist map and shown by a broken line in FIG. 10 when the failure occurs, switches the assist maps, hereinafter called "gradually changing assist maps", shown by dashed lines in FIG. 10, in the order of A, B, and C at predetermined time intervals after the failure occurs, and uses the assist map, hereinafter called a "second characteristic assist map", having a characteristic (a second characteristic) shown by the solid line in FIG. 10 finally. Moreover, though the present configuration example uses three gradually changing assist maps, the number of used gradually changing assist maps may be determined optionally, and the time intervals of switching may be also determined optionally. The time interval of switching from the first characteristic assist map to the gradually changing assist map and the time interval of switching between the gradually changing assist maps may be the same or different. Further, though the characteristics of the by-system assist maps shown by the solid lines in FIG. 3 and FIG. 10 are expressed using only the steering torque Ts as a parameter, it is possible to calculate the current command value I* adding the vehicle speed Vs and the motor rotational frequency ω to the parameter.

Figure 11:
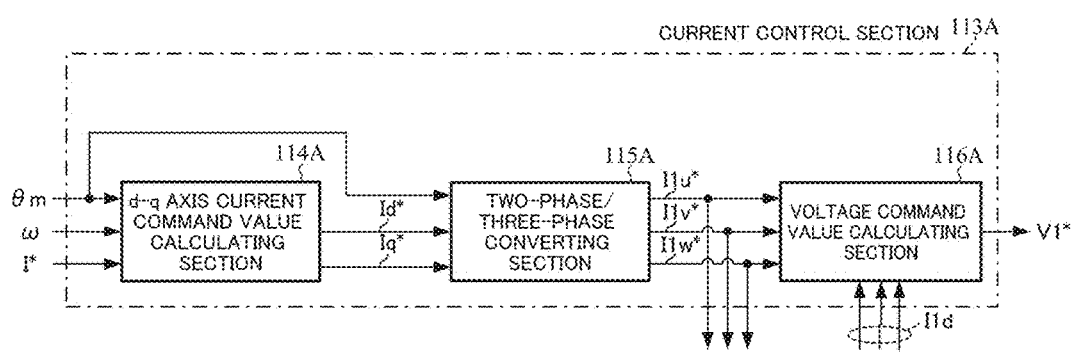
FIG. 11 is a block diagram showing a configuration example of a current control section of the first embodiment.

FIG. 11 shows a configuration example of the current control section 113A. The current control section 113A comprises a d–q axis current command value calculating section 114A, a two-phase/three-phase converting section 115A, and a voltage command value calculating section 116A. The d-q axis current command value calculating section 114A calculates a d-axis current command value Id* and a q-axis current command value Iq* of a d–q coordinate system in a vector control on the basis of the current command value I*, the motor rotational angle θm, and the motor rotational frequency ω. The two-phase/three-phase converting section 115A calculates a U-phase current command value I1u*, a V-phase current command value I1v* and a W-phase current command value I1w* by performing two-phase/three-phase conversion with respect to the d-axis current command value Id* and the q-axis current command value Iq* calculated, in accordance with the motor rotational angle θm. The voltage command value calculating section 116A calculates current deviations ΔIu, ΔIv and ΔIw between the U-phase current command value I1u*, the V-phase current command value I1v* and the W-phase current command value I1w* calculated and addition values of respective phases of the motor current I1d detected by the current detecting circuit 121A. The voltage command value calculating section 116A performs a PI-control calculation and so on with respect to the current deviations ΔIu, ΔIv and ΔIw, calculates a three-phase voltage command value V1* for the motor driving circuit 120A, and outputs the calculated three-phase voltage command value V1* to the motor driving circuit 120A. The U-phase current command value I1u*, the V-phase current command value I1v* and the W-phase current command value I1w* calculated by the two-phase/three-phase converting section 115A are also outputted to the failure detecting section 111.

The current control section 113B has the same configuration as the current control section 113A. The current control section 113B calculates a three-phase voltage command value V2* for the motor driving circuit 120B using the current command value I*, the motor rotational angle θm, the motor rotational frequency ω, and the motor current I2d detected by the current detecting circuit 121B, and outputs the calculated three-phase voltage command value V2* to the motor driving circuit 120B. A U-phase current command value I2u*, a V-phase current command value I2v* and a W-phase current command value I2w* calculated by the current control section 113B are also outputted to the failure detecting section 111. Moreover, the three-phase voltage command values V1* and V2* are outputted as the same value mutually when the motor control unit 100 operates normally.

In addition to the U-phase current command value I1u*, the V-phase current command value I1v*, the W-phase current command value I1w*, the U-phase current command value I2u*, the V-phase current command value I2v* and the W-phase current command value I2w*, motor current detection values I1ud, I1vd, I1wd, I2ud, I2ud, and I2wd that are detected by failure detecting circuits 131A and 131B provided between the motor current cut-off circuits 130A and 130B and the first motor winding L1 and the second motor winding L2 of the motor 200 are inputted into the failure detecting section 111. The failure detecting section 111 compares the inputted motor current detection values I1ud to I1wd and I2ud to I2wd with the inputted each-phase current command values I1u* to I1w* and I2u* to I2w* respectively, and detects an open failure (OFF-failure) and a short failure (ON-failure) of field effect transistors (FETs) Q1 to Q6 serving as switching elements that constitute inverters 122A and 122B. When detecting the open failure or the short failure of the FETs constituting the inverters 122A and 122B, the failure detecting section 111 outputs a faulty system cut-off command SAa or SAb to a gate driving circuit 123A or 123B of the motor driving circuit 120A or 120B where the failure is detected, and outputs a current command value change command ISW to the torque control section 112.

The motor driving circuits 120A and 120B respectively comprise the gate driving circuits 123A and 123B that generate gate signals by inputting the three-phase voltage command values V1* and V2* outputted from the control calculating section 110 and serve as the current control sections at failure, and the inverters 122A and 122B that input the gate signals outputted from the gate driving circuits 123A and 123B.

When the voltage command values V1* and V2* are inputted from the control calculating section 110, each of the gate driving circuits 123A and 123B generates six PWM-signals (gate signals) based on the voltage command values V1* and V2* and a carrier signal of a triangular wave, and outputs these PWM-signals to the inverters 122A and 122B.

Further, at the normal time when the faulty system cut-off command SAa is not inputted into the gate driving circuit 123A from the control calculating section 110, the gate driving circuit 123A outputs three gate signals of high level to the motor current cut-off circuit 130A, and outputs two gate signals of high level to a power source cut-off circuit 124A. At the failure when the faulty system cut-off command SAa has been inputted into the gate driving circuit 123A from the control calculating section 110, the gate driving circuit 123A simultaneously outputs three gate signals of low level to the motor current cut-off circuit 130A, cuts off the motor currents, simultaneously outputs two gate signals of low level to the power source cut-off circuit 124A, and cuts off a battery power.

Similarly, at the normal time when the faulty system cut-off command SAb is not inputted into the gate driving circuit 123B from the control calculating section 110, the gate driving circuit 123B outputs three gate signals of high level to the motor current cut-off circuit 130B, and outputs two gate signals of high level to a power source cut-off circuit 124B. At the failure when the faulty system cut-off command SAb has been inputted into the gate driving circuit 123B from the control calculating section 110, the gate driving circuit 123B simultaneously outputs three gate signals of low level to the motor current cut-off circuit 130B, cuts off the motor currents, simultaneously outputs two gate signals of low level to the power source cut-off circuit 124B, and cuts off the battery power.

A battery current of the battery 103 is inputted into the inverters 122A and 122B respectively through the noise filter 104 and the power source cut-off circuits 124A and 124B, and electrolytic capacitors CA and CB for smoothing are respectively connected to input sides of the inverters 122A and 122B.

The inverters 122A and 122B respectively have six FETs Q1 to Q6 serving as switching elements, and have a configuration created by connecting in parallel three switching-arms (SAu, SAv and SAw in the inverter 122A, SBu, SBv and SBw in the inverter 122B) that are configured by connecting in series two FETs. The U-phase currents I1$u$ and I2$u$, the V-phase currents I1$v$ and I2$v$, and the W-phase currents I1$w$ and I2$w$, which are the motor driving currents, are inputted from a connection between the FETs of each switching-arm into the first motor winding L1 and the second motor winding L2 of the motor 200 through the motor current cut-off circuits 130A and 130B by inputting the PWM-signals outputted from the gate driving circuits 123A and 123B into the gates of the FETs Q1 to Q6.

A both-end voltage of a shunt resistor, which is not shown in FIG. 8, interposed between each switching-arm of the inverter 122A and 122B and the ground is inputted into the current detecting circuits 121A and 121B in the motor driving circuits 120A and 120B, and the motor currents I1$d$ and I2$d$ are detected.

The motor current cut-off circuit 130A has three FETs QA1, QA2 and QA3 for current cut-off, and the motor current cut-off circuit 130B has three FETs QB1, QB2 and QB3 for current cut-off. The FETs QA1 to QA3 and the FETs QB1 to QB3 of the motor current cut-off circuits 130A and 130B are connected to respective parasitic diodes whose cathodes are disposed at the inverters 122A and 122B sides in the same direction.

The power source cut-off circuits 124A and 124B respectively have a series circuit configuration that two FETs QC1 and QC2 and two FETs QD1 and QD2 are disposed such that drains are connected each other and parasitic diodes are provided in an opposite direction. Sources of the FETs QC1 and QD1 are connected each other, and are connected to an output side of the noise filter 104. Sources of the FETs QC2 and QD2 are respectively connected to sources of the FETs Q1, Q2 and Q3 of the inverters 122A and 122B.

In such a configuration, an operating example will be described.

As the operation starts, the motor rotational angle detecting circuit 102 detects the motor rotational angle θm of the motor 200, and outputs it to the motor rotational frequency calculating section 105 and the current control sections 113A and 113B in the control calculating section 110.

The motor rotational frequency calculating section 105 calculates the motor rotational frequency ω by means of the motor rotational angle θm, and outputs it to the torque control section 112, the current control sections 113A and 113B in the control calculating section 110.

Figure 12:
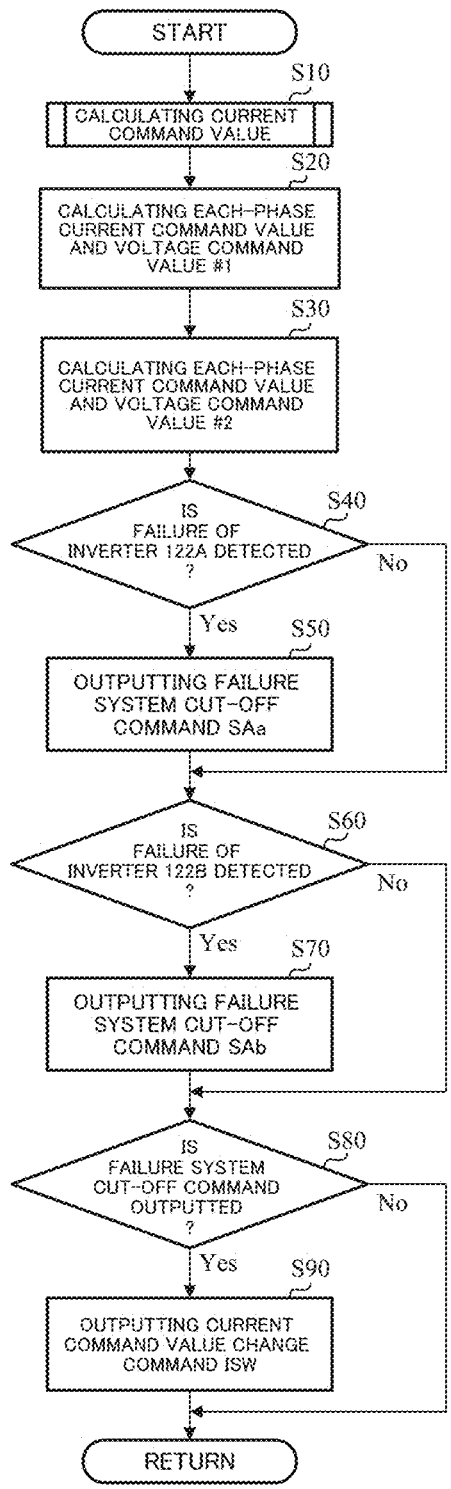
FIG. 12 is a part of a flowchart showing an operating example of the control calculating section of the first embodiment.
Figure 13:
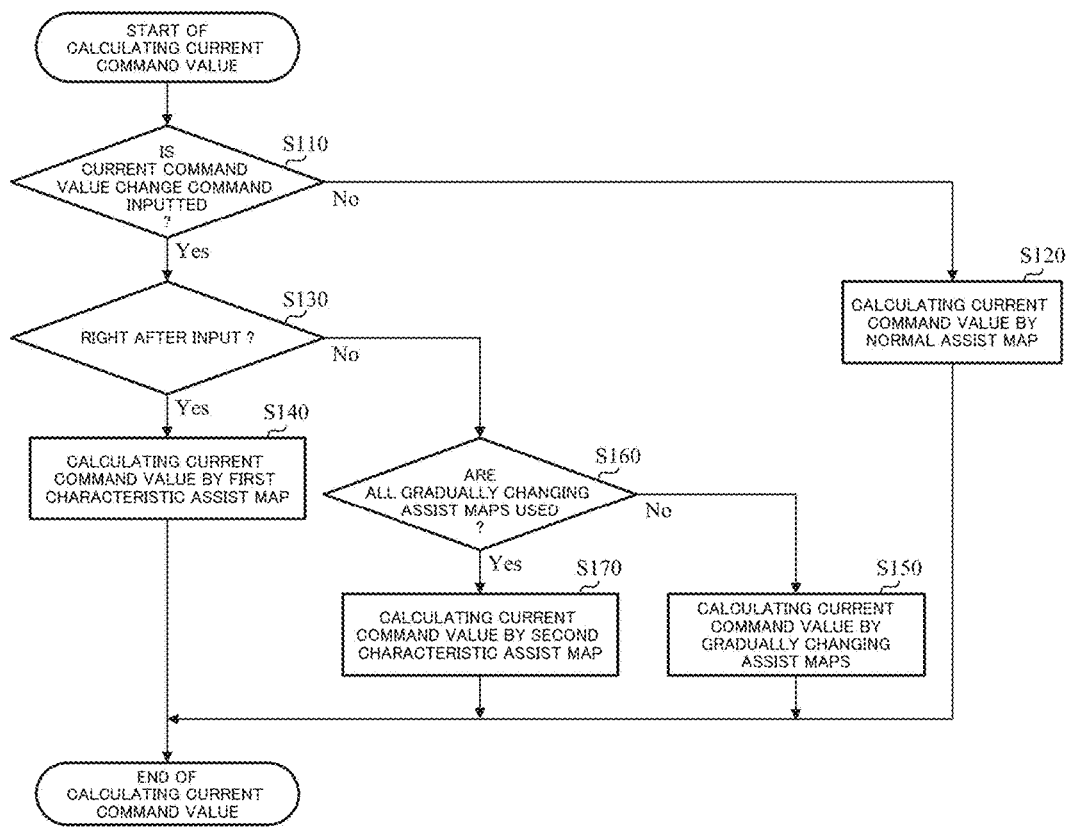
FIG. 13 is a part of the flowchart showing the operating example of the control calculating section of the first embodiment.

An operating example of the control calculating section 110 will be described with reference to flowcharts in FIG. 12 and FIG. 13.

The torque control section 112 is inputted the motor rotational frequency ω, the steering torque Ts detected by the torque sensor 10, and the vehicle speed Vs detected by the vehicle speed sensor 12, and calculates the current command value I* using the assist map (Step S10).

In the calculation of the current command value I*, first, it is confirmed whether the current command value change command ISW has been inputted (Step S110). When the current command value change command ISW is not inputted, the current command value I* is calculated using the normal assist map because it means that the failure of the FETs constituting the inverters 122A and 122B is not detected (Step S120). When the current command value change command ISW has been inputted, the current command value I* is calculated by switching the assist map in accordance with time passing from input of the current command value change command ISW because it means that the failure has been detected. That is, when it is right after inputting the current command value change command ISW (Step S130), the current command value I* is calculated by switching to the first characteristic assist map (Step S140). When it is not right after inputting the current command value change command ISW (Step S130), the current command value I* is calculated by switching to the gradually changing assist maps in turn as the predetermined time intervals pass (Step S150). When all gradually changing assist maps are used (Step S160), the current command value I* is calculated by switching to the second characteristic assist map (Step S170). Thereafter, the current command value I* is calculated still using the second characteristic assist map.

The calculated current command value I* is inputted into the current control section 113A and the current control section 113B in the control calculating section 110.

The current command value I*, the motor rotational angle θm and the motor rotational frequency ω are inputted into the d–q axis current command value calculating section 114A in the current control section 113A. The d–q axis current command value calculating section 114A calculates the d-axis current command value Id* and the q-axis current command value Iq* on the basis of the current command value I*, the motor rotational angle θm and the motor rotational frequency ω, and outputs them to the two-phase/three-phase converting section 115A. The two-phase/three-phase converting section 115A calculates the U-phase current command value I1$u$*, the V-phase current command value I1$v$* and the W-phase current command value I1$w$* by performing two-phase/three-phase conversion with respect to the d-axis current command value Id* and the q-axis current command value Iq* in accordance with the motor rotational angle θm. The each-phase current command values I1$u$*, I1$v$* and I1$w$* are outputted to the voltage command value calculating section 116A and the failure detecting section 111. The voltage command value calculating section 116A calculates the current deviations ΔIu, ΔIv and ΔIw between the each-phase current command values I1$u$*, I1$v$* and I1$w$* and the addition values of respective phases of the motor current I1$d$ detected by the current detecting circuit 121A, calculates the voltage command value V1* by performing the PI-control calculation or the PID-control calculation with respect to the calculated current deviations ΔIu, ΔIv and ΔIw, and outputs the voltage command value V1* to the motor driving circuit 120A (Step S20).

According to the same operation as the current control section 113A, the current control section 113B also calculates the each-phase current command values I2$u$*, I2$v$* and I2$w$* and the voltage command value V2* using the current command value I*, the motor rotational angle θm, the motor rotational frequency ω and the motor current I2$d$, the each-phase current command values I2$u$*, I2$v$* and I2$w$* are outputted to the failure detecting section 111, and the voltage command value V2* is outputted to the motor driving circuit 120B (Step S30).

The failure detecting section 111 inputting the each-phase current command values I1$u$*, I1$v$*, I1$w$*, I2$u$*, I2$v$* and I2$w$* also inputs the motor current detection values I1$ud$, I1$vd$, I1$wd$, I2$ud$, I2$vd$ and I2$wd$ detected by the failure detecting circuits 131A and 131B, and detects the open failure and the short failure of the FETs constituting the inverters 122A and 122B. When detecting the failure by comparing the each-phase current command values I1$u$*, I1$v$* and I1$w$* with the motor current detection values I1$ud$, I1$vd$ and I1$wd$ (Step S40), the failure detecting section 111 outputs the faulty system cut-off command SAa to the motor driving circuit 120A (Step S50). When detecting the failure by comparing the each-phase current command values I2$u$*, I2$v$* and I2$w$* with the motor current detection values I2$ud$, I2$vd$ and I2$wd$ (Step S60), the failure detecting section 111 outputs the faulty system cut-off command SAb to the motor driving circuit 120B (Step S70). When outputting the faulty system cut-off commands SAa or/and SAb (Step S80), that is, when detecting the failures of the inverters 122A or/and 122B, the failure detecting section 111 outputs the current command value change command ISW to the torque control section 112 (Step S90). The current command value change command ISW is used in judging the condition at Step S110.

In the motor driving circuit 120A, the voltage command value V1* is inputted into the gate driving circuit 123A, and the faulty system cut-off command SAa is also inputted into the gate driving circuit 123A when the failure detecting section 111 has outputted the faulty system cut-off command SAa. When the voltage command values V1* is inputted, the gate driving circuit 123A generates the six PWM-signals based on the voltage command values V1* and the carrier signal of the triangular wave, and outputs the PWM-signals to the inverter 122A. When the faulty system cut-off command SAa is not inputted, the gate driving circuit 123A outputs the gate signals of high level to the motor current cut-off circuit 130A and the power source cut-off circuit 124A. Herewith, the FETs QA1, QA2 and QA3 of the motor current cut-off circuit 130A become an on-state, conduction becomes possible between the inverter 122A and the first motor winding L1 of the motor 200, moreover, the FETs QC1 and QC2 of the power source cut-off circuit 124A become an on-state, and a direct current from the battery 103 is supplied to the inverter 122A through the noise filter 104. Therefore, the PWM-signals outputted from the gate driving circuit 123A are inputted into the gates of the FETs Q1 to Q6 of the inverter 122A, and the U-phase current I1$u$, the V-phase current I1$v$ and the W-phase current I1$w$ are inputted from the connection between the FETs of each of the switching-arms SAu, SAv and SAw into the first motor winding L1 of the motor 200. When the faulty system cut-off command SAa has been inputted, the gate driving circuit 123A outputs the gate signals of low level to the motor current cut-off circuit 130A and the power source cut-off circuit 124A. Herewith, the FETs QA1, QA2 and QA3 of the motor current cut-off circuit 130A become an off-state, the conduction to the first motor winding L1 of the motor 200 is cut off, moreover, the FETs QC1 and QC2 of the power source cut-off circuit 124A become an off-state, and supply of the direct current from the battery 100 to the inverter 122A is cut off.

According to the same operation as the motor driving circuit 120A, the current of each phase inputted into the second motor winding L2 of the motor 200 is controlled in the motor driving circuit 120B.

Thus, the first embodiment can improve the discontinuous feeling of the assist because of calculating the current command value by switching the by-system assist map to the first characteristic assist map when detecting the failure. Subsequently, the first embodiment relieves the discontinuous feeling of the assist by sequentially switching to the gradually changing assist maps, and enables smooth handling that the steering torque increases smoothly for increase in load because of calculating the current command value by switching to the second characteristic assist map having a characteristic that a gradient of change to the steering torque is gentle and its output is saturated to the maximum output mathematically smoothly finally.

Moreover, though the first embodiment performs the change from the first characteristic to the second characteristic using the gradually changing assist maps, the change may be performed by such a method as to decrease the current command value at a fixed rate. For example, in the case that the change from the first characteristic to the second characteristic is performed in K stages ("K" is an integer which is two or more), the current command value Ik that is used in k-th stage ("k" is an integer which is one or more and less than K) is calculated as Ik=If−k×(If−Is)/K when the current command value by the first characteristic assist map is If and the current command value by the second characteristic assist map is Is in the state. This can reduce an area for storing the gradually changing assist maps.

Further, it is possible to perform a characteristic compensation of the steering system in the torque control section 112 of the first embodiment so as to improve a convergence, an inertia characteristic and so on. For example, the torque control section 112 calculates a convergence compensation value that compensates a convergence of a yaw rate on the basis of the motor rotational frequency (a motor angular velocity) ω, calculates a torque compensation value that compensates an amount corresponding to a torque occurring by an inertia of the motor 200 so as to prevent deterioration of an inertia feeling or control responsiveness on the basis of a motor angular acceleration α calculated from the motor rotational frequency ω, calculates a SAT compensation value that compensates the assist force of the motor 200 on the basis of estimated or detected SAT, and performs the characteristic compensation by adding these compensation values to the current command value I*.

Furthermore, though the first embodiment calculates the each-phase current command values individually, it is possible to calculate the current command value of one phase based on a total value of the current command values of the other two phases. This enables reduction of an operation amount.

Figure 14:
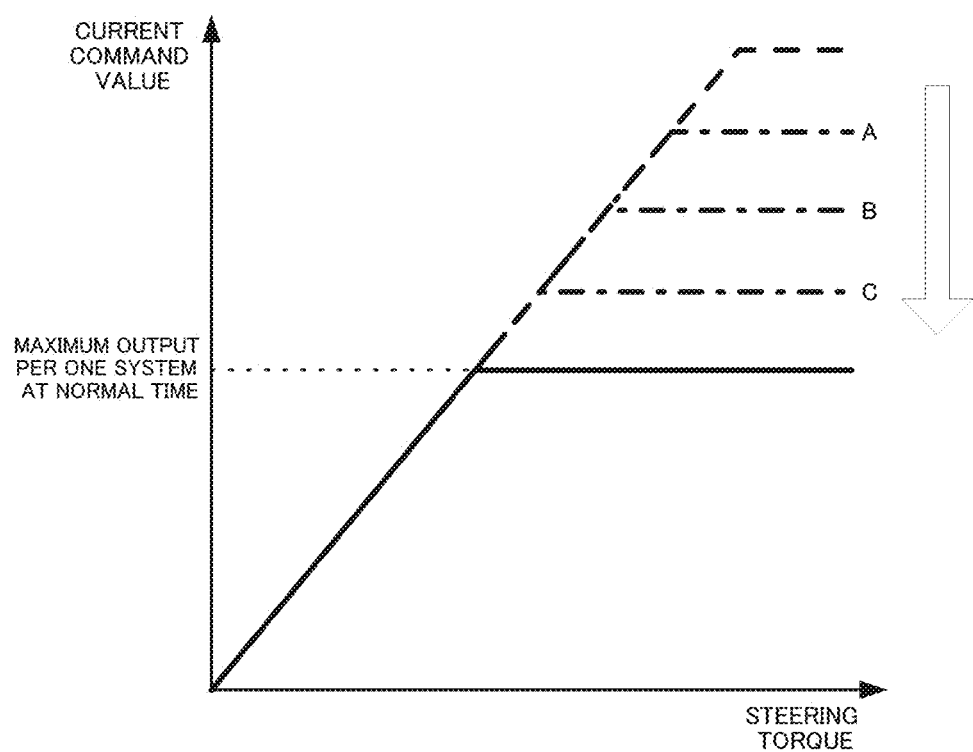
FIG. 14 is a characteristic diagram showing an example (a second embodiment) of the assist map that gradually changes in accordance with time when a failure occurs.

It is possible to use assist maps having characteristics shown in FIG. 14 as the by-system assist map. That is, the torque control section uses the first characteristic assist map having the characteristic (the first characteristic) equivalent to the whole assist map as shown by a broken line in FIG. 14 in the same way as the first embodiment shown in FIG. 10 when the failure occurs, switches the gradually changing assist maps having characteristics shown by dashed lines in FIG. 14 in the order of A, B and C at predetermined time intervals after the failure occurs, and uses the second characteristic assist map having the characteristic (the second characteristic) shown by the solid line in FIG. 14 finally.

A configuration example (a second embodiment) using the assist maps having the characteristics shown in FIG. 14 has only a difference that the by-system assist map which the torque control section has is the assist map having the characteristic shown in FIG. 14, and the others are the same as the configuration example of the first embodiment. An operating example of the second embodiment also has only a difference of using the assist maps having the characteristics shown in FIG. 14 as the by-system assist map, and the others are the same as the operating example of the first embodiment. Moreover, similarly to the case with the first embodiment, the number of used gradually changing assist maps may be determined optionally, the time intervals of switching may be also determined optionally, and the time interval of switching from the first characteristic assist map to the gradually changing assist map and the time interval of switching between the gradually changing assist maps may be the same or different. Further, though the characteristic of the by-system assist map shown by the solid line in FIG. 14 is expressed using only the steering torque Ts as a parameter, it is possible to calculate the current command value I* adding the vehicle speed Vs and the motor rotational frequency ω to the parameter.

Thus, the second embodiment can improve the discontinuous feeling of the assist because of calculating the current command value by switching the by-system assist map to the first characteristic assist map when detecting the failure. Subsequently, the second embodiment relieves the discontinuous feeling of the assist by sequentially switching to the gradually changing assist maps, and enables a steering feeling equivalent to at normal time until the output is saturated because of calculating the current command value by switching to the second characteristic assist map having a characteristic equivalent to before the failure until the maximum output finally.

Moreover, similarly to the case with the first embodiment, though the second embodiment also performs the change from the first characteristic to the second characteristic using the gradually changing assist maps, the change may be performed by such a method as to decrease the current command value at a fixed rate. For example, in the case that the change from the first characteristic to the second characteristic is performed in K stages, the current command value Ik that is used in k-th stage is calculated as follows: the maximum value Ikmax is calculated as Ifmax−k×(Ifmax−Ismax)/K ("Ifmax" is a maximum value of the first characteristic assist map, "Ismax" is a maximum value of the second characteristic assist map), the calculated current command value is the current command value Ik when the current command value calculated by using the first characteristic assist map does not exceed Ikmax, and Ikmax is the current command value Ik when that exceeds Ikmax. This can reduce an area for storing the gradually changing assist maps. Further, the characteristic compensation of the steering system in the torque control section and the calculation of the current command value of one phase on the basis of a total value of the current command values of the other two phases may be also performed similarly to the case with the first embodiment.

It is possible to perform the change from the first characteristic to the second characteristic not by gradually performing it according to the lapse of time as the first and the second embodiments perform, but by the steering condition or the driving condition. For example, the by-system assist map is switched from the first characteristic assist map to the second characteristic assist map at the timing when the current command value becomes minimum such as "when there is no steering torque", "when the steering wheel is near the center", "when the vehicle runs straight", "when the vehicle stops", etc.

A configuration example (a third embodiment) that performs the change from the first characteristic to the second characteristic depending on the steering condition or the driving condition has the same configuration as the first embodiment, and the operation of calculating the current command value in the torque control section is different. The torque control section of the third embodiment uses the normal assist map, the first characteristic assist map and the second characteristic assist map as the by-system assist map. The torque control section uses the normal assist map at normal time, uses the first characteristic assist map when the failure occurs, and uses the second characteristic assist map when the steering condition or the driving condition above, hereinafter called a "switching condition" collectively, is first satisfied after the failure occurs. Subsequently, the torque control section continues to use the second characteristic assist map, and calculates the current command value.

Figure 15:
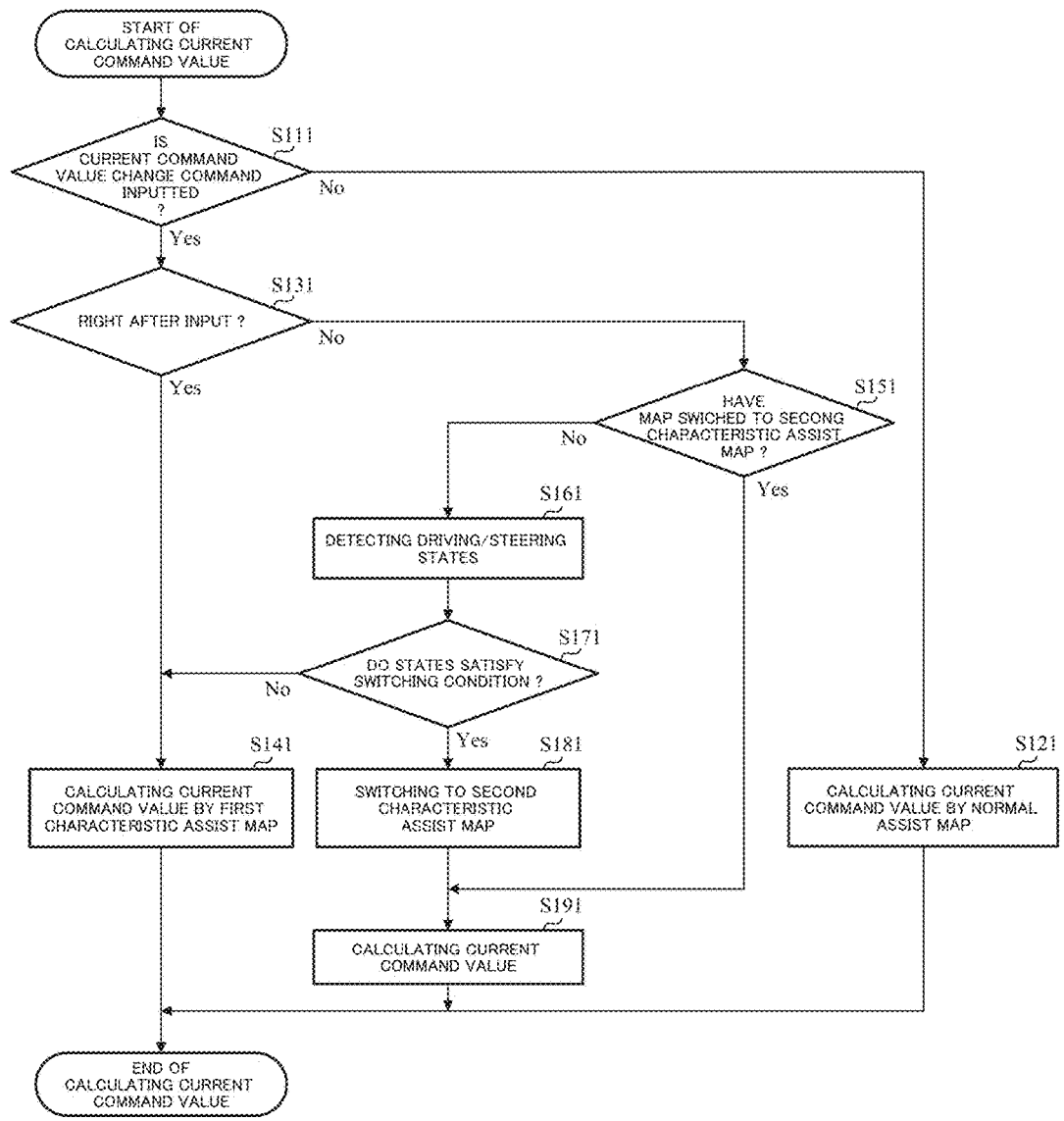
FIG. 15 is a part of the flowchart showing an operating example of a control calculating section in a configuration example (a third embodiment) of the motor control unit of the present invention.

An operating example of calculating the current command value in the torque control section of the third embodiment will be described with reference to a flowchart in FIG. 15.

First, it is confirmed whether the current command value change command ISW has been inputted (Step S111). When the current command value change command ISW is not inputted, the current command value I* is calculated using the normal assist map because it means that the failure of the FETs constituting the inverters 122A and 122B is not detected (Step S121). When the current command value change command ISW has been inputted, the current command value I* is calculated by switching the assist map because it means that the failure has been detected. That is, when it is right after inputting the current command value change command ISW (Step S131), the current command value I* is calculated by switching to the first characteristic assist map (Step S141). When it is not right after inputting the current command value change command ISW (Step S131), it is confirmed whether to have switched to the second characteristic assist map (Step S151). When not switching to the second characteristic assist map, a driving state and a steering state are detected (Step S161). When having switched to the second characteristic assist map, the current command value I* is calculated using the second characteristic assist map (Step S191). This means that the switching condition has been already satisfied when having switched to the second characteristic assist map, and it is not necessary to switch the by-system assist map, so that it is confirmed whether to have switched to the second characteristic assist map before detecting the driving state and the steering state. After the driving state and the steering state are detected, it is confirmed whether the driving state and the steering state detected satisfy the switching condition (Step S171). When the states satisfy the switching condition, the by-system assist map is switched to the second characteristic assist map (Step S181), and the current command value I* is calculated (Step S191). When the states do not satisfy the switching condition, the current command value I* is continuously calculated using the first characteristic assist map (Step S141). After the by-system assist map is switched to the second characteristic assist map, the current command value I* is continuously calculated using the second characteristic assist map as is.

Thus, the third embodiment can switch the by-system assist map with suppressing the influence of the fluctuation of the motor assist force that the steering operator perceives before and after the change of the assist map.

Though the control calculating section of the first embodiment comprises two current control sections, a configuration of getting the current control sections together is possible. Getting them together can make the unit compact.

Figure 16:
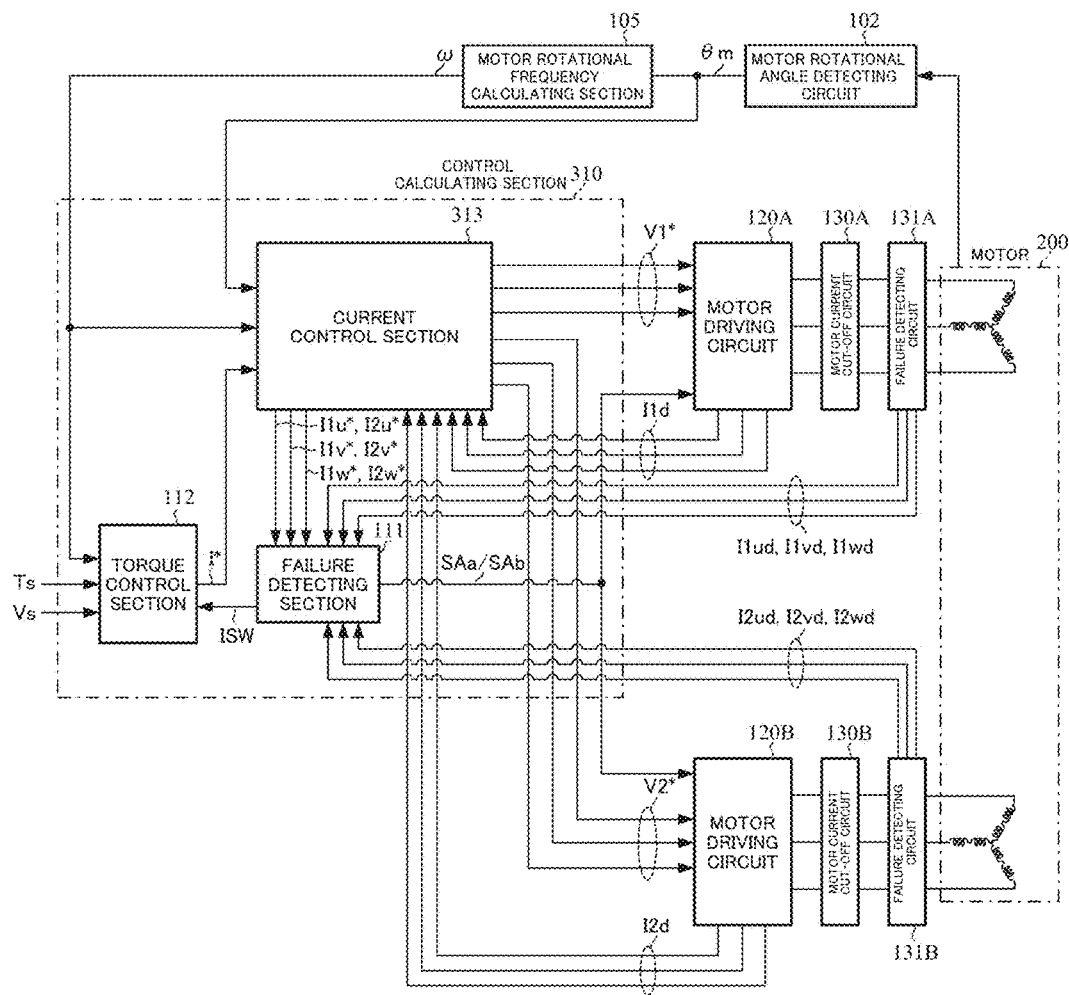
FIG. 16 is a block diagram showing a configuration example of a control calculating section in a configuration example (a fourth embodiment) of the motor control unit of the present invention.

A block diagram showing a configuration example (a fourth embodiment) of the motor control unit of the present invention that gets the current control sections of the control calculating section together is shown in FIG. 16. Compared with the control calculating section 110 of the first embodiment shown in FIG. 9, a control calculating section 310 of the fourth embodiment comprises one current control section. A current control section 313 outputs the voltage command values V1* and V2*, and outputs the each-phase current command values I1u*, I1v*, I1w*, I2u*, I2v* and I2w*. Further, the motor currents I1d and I2d that the motor driving circuits 120A and 120B output are inputted into the current control section 313.

Operations of the fourth embodiment are the same as the first embodiment except an operation of the current control section 313. The operation of the current control section 313 consists of the operation of the current control section 113A and the operation of the current control section 113B in the first embodiment. That is, the current control section 313 inputs the current command value I* which the torque control section outputs, the motor rotational angle θm which the motor rotational angle detecting circuit 102 outputs, the motor rotational frequency ω which the motor rotational frequency calculating section 105 outputs, the motor current I1d which the motor driving circuit 120A outputs, and the motor current I2d which the motor driving circuit 120B outputs, performs Step S20 and S30 in the flowchart shown in FIG. 12, and outputs the voltage command values V1* and V2*, and the each-phase current command values I1u*, I1v*, I1w*, I2u*, I2v* and I2w*.

In the embodiments (the first embodiment to the fourth embodiment) as mentioned above, though the three-phase motor of the two-system motor windings is described, the present invention can be applied to a motor having the multi-system motor winding, which has three or more systems, similarly, and can be applied to a multi-phase motor, which has four or more phases. In the case of applying to a motor having M-system motor winding ("M" is an integer which is three or more), when m ("m" is an integer which is one or more and less than M) motor windings fail, (M−m) by-system assist maps of the normal systems form the whole characteristic, so that, for example, the first characteristic assist map is made by multiplying the whole assist map by 1/(M−m).

Moreover, though the above embodiments deal with the failure of the inverter in the motor driving circuit as the detected failure, the present invention can be applied to the case that the motor winding fails. Further, though the star-connection is used as the method of connecting the coils, a delta-connection may be used.

| Explanation of Reference Numerals | |
|---|---|
| 1 | steering wheel |
| 2 | column shaft (steering shaft, handle shaft) |
| 10 | torque sensor |
| 12 | vehicle speed sensor |
| 14 | steering angle sensor |
| 20 | motor |
| 30 | control unit (ECU) |
| 100 | motor control unit |
| 101 | rotational position sensor |
| 102 | motor rotational angle detecting circuit |
| 103 | battery |
| 104 | noise filter |
| 105 | motor rotational frequency calculating section |
| 110, 310 | control calculating section |
| 111 | failure detecting section |
| 112 | torque control section |
| 113A, 113B, 313 | current control section |
| 114A | d-q axis current command value calculating section |
| 115A | two-phase/three-phase converting section |
| 116A | voltage command value calculating section |
| 120A, 120B | motor driving circuit |
| 121A, 121B | current detecting circuit |
| 122A, 122B | inverter |
| 123A, 123B | gate driving circuit |
| 124A, 124B | power source cut-off circuit |
| 130A, 130B | motor current cut-off circuit |
| 131A, 131B | failure detecting circuit |
| 200 | two-system winding motor |

The invention claimed is:

1. A motor control unit comprising:
motor driving circuits of respective winding systems that supply a motor having multi-system motor windings with driving currents; and
a control calculating section that calculates a current command value of each winding system for driving said motor, when a failure occurs in said motor winding or said motor driving circuit in any of said systems, performs a first change of changing a characteristic of said current command value of a normal system to a first characteristic that forms a characteristic equivalent to a total of said current command values at normal time, after performing said first change, performs a second change of changing said characteristic of said current command value to a second characteristic whose output is more suppressed than said first characteristic when there is no steering torque, when a steering wheel is near a center, or when a vehicle runs straight, and controls said motor driving circuit.

2. The motor control unit according to claim 1, wherein said second characteristic is a characteristic whose gradient is gentler than said first characteristic and that asymptotically changes so as to converge at a maximum output near said maximum output.

3. The motor control unit according to claim 2, wherein said characteristic of said current command value is defined by an assist map.

4. The motor control unit according to claim 2, wherein said characteristic of said current command value is a characteristic that changes depending on at least a steering torque.

5. The motor control unit according to claim 2, wherein a system where said failure occurs in said motor winding or said motor driving circuit is cut off when said failure occurs.

6. The motor control unit according to claim 1, wherein said second characteristic is a characteristic whose output does not exceed a maximum output and that is equivalent to said first characteristic until said maximum output.

7. The motor control unit according to claim 6, wherein said characteristic of said current command value is defined by an assist map.

8. The motor control unit according to claim 6, wherein said characteristic of said current command value is a characteristic that changes depending on at least a steering torque.

9. The motor control unit according to claim 6, wherein a system where said failure occurs in said motor winding or said motor driving circuit is cut off when said failure occurs.

10. The motor control unit according to claim 1, wherein said characteristic of said current command value is defined by an assist map.

11. The motor control unit according to claim 10, wherein said characteristic of said current command value is a characteristic that changes depending on at least a steering torque.

12. The motor control unit according to claim 10, wherein a system where said failure occurs in said motor winding or said motor driving circuit is cut off when said failure occurs.

13. The motor control unit according to claim 1, wherein said characteristic of said current command value is a characteristic that changes depending on at least a steering torque.

14. The motor control unit according to claim 13, wherein a system where said failure occurs in said motor winding or said motor driving circuit is cut off when said failure occurs.

15. The motor control unit according to claim 1, wherein a system where said failure occurs in said motor winding or said motor driving circuit is cut off when said failure occurs.

16. An electric power steering apparatus that drives and controls said motor by the motor control unit according to claim 1, wherein
an assist force is applied to a steering system of a vehicle.

17. An electric power steering apparatus that drives and controls said motor by the motor control unit according to claim 2, wherein
an assist force is applied to a steering system of a vehicle.

18. An electric power steering apparatus that drives and controls said motor by the motor control unit according to claim 6, wherein
an assist force is applied to a steering system of a vehicle.

19. A vehicle that is equipped with the electric power steering apparatus according to claim 16.

* * * * *